Jan. 29, 1924.　　　　　　　　　　　　　　　　1,482,248
A. F. OCHTMAN
SWITCH FOR AUTO TURNING SIGNALS
Filed March 11, 1922　　　2 Sheets-Sheet 1

WITNESSES

INVENTOR
Arthur F. Ochtman
BY
ATTORNEYS

Jan. 29, 1924.  
A. F. OCHTMAN  
1,482,248  
SWITCH FOR AUTO TURNING SIGNALS  
Filed March 11, 1922    2 Sheets-Sheet 2

WITNESSES  
INVENTOR  
Arthur F. Ochtman  
BY  
ATTORNEYS

Patented Jan. 29, 1924.

1,482,248

UNITED STATES PATENT OFFICE.

ARTHUR F. OCHTMAN, OF COSCOB, CONNECTICUT.

SWITCH FOR AUTO TURNING SIGNALS.

Application filed March 11, 1922. Serial No. 542,867.

*To all whom it may concern:*

Be it known that I, ARTHUR F. OCHTMAN, a citizen of the United States, and a resident of Coscob, in the county of Fairfield and State of Connecticut, have invented a new and Improved Switch for Auto Turning Signals, of which the following is a full, clear, and exact description.

This invention relates to signalling devices for automobiles and particularly to an improved switch mechanism for operating the lights or other signal members.

The object in view is to provide an improved construction which will be semiautomatic, the structure being such that it may be set to indicate a turn or other signal an appreciable time before the operation of the turn.

Another object of the invention is to provide an improved switch mechanism arranged near the driver of an automobile and formed so that he must operate the same manually to set the signal while the switch mechanism will be automatically re-set when the turn or other maneuver has been carried out.

A still further object, more specifically, is to provide a switch mechanism for signal lamps of automobiles wherein the circuit may be closed for either lamp manually and this closing action causing members to be projected to a given position, the same being associated with a movable re-setting arm secured to the steering wheel of the automobile whereby said arm will re-set or open the switch after the turning operation has been performed.

In the accompanying drawings—

Figure 1:
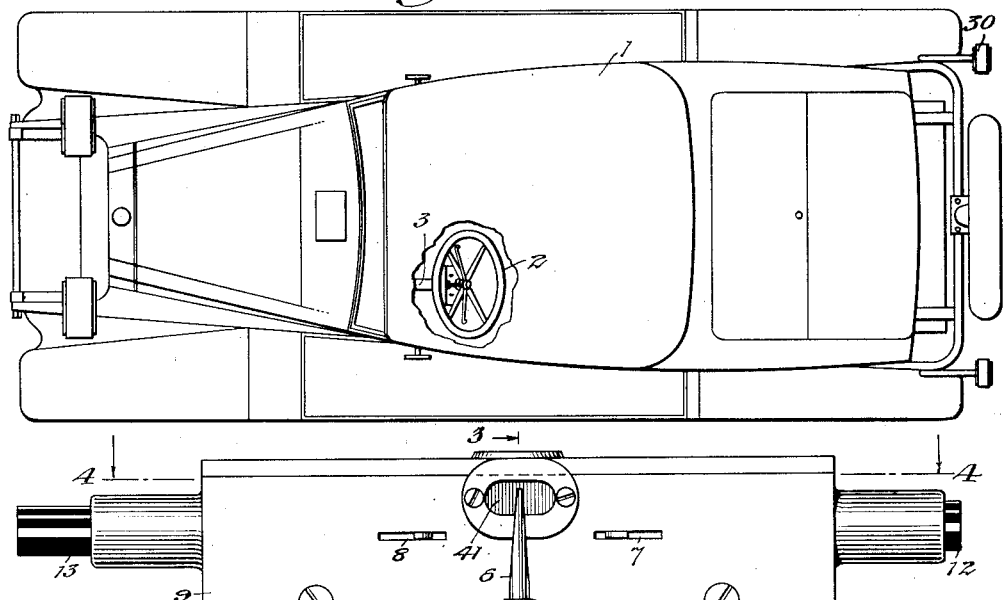
Figure 1 is a top plan view of an automobile with an embodiment of the invention applied thereto.

Referring to the accompanying drawings by numeral, 1 indicates an automobile of any desired kind and 2 the steering wheel which is of the usual construction and co-acts with the usual steering column 3 of usual construction. A band 4 is clamped by a suitable bolt 5 to the hub of the steering wheel 2 so as to rotate with the steering wheel. This band carries a shift arm 6 adapted to engage and strike the re-setting levers 7 and 8. The re-setting levers 7 and 8 form part of a switch mechanism mounted in the box 9, which box is rigidly clamped to the steering column 2 by any suitable clamping means 10 held in place by suitable screws 11. In the switch box 9 is arranged two sets of switch mechanisms which are closed by the actuation of the push buttons 12 and 13, said actuation being manual. The switch mechanisms just mentioned are opened or re-set by the levers 7 and 8. As one switch mechanism is identical with the other, only one will be described.

Figure 4:
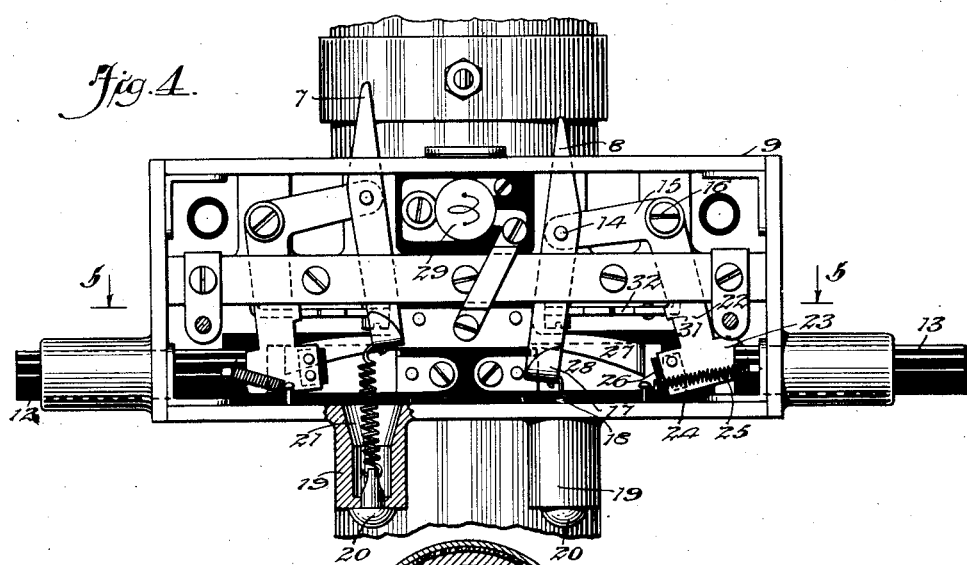
Figure 4 is a sectional view through Figure 2 approximately on line 4—4.
Figure 5:
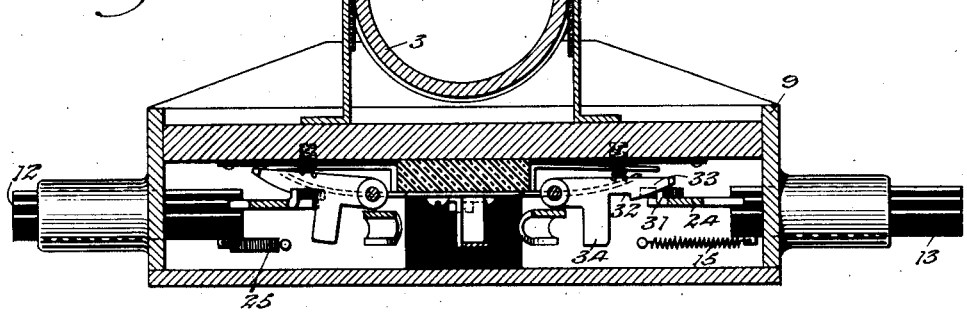
Figure 5 is a sectional view through Figure 4 approximately on line 5—5.

As shown in Figure 4, the re-setting lever 8 is pivotally mounted at 14 on one end of a bell crank lever 15, which lever is pivotally mounted at 16 on a suitable projection of the casing 9. The lever 8 is provided with a turned over end 17 to which a retractile spring 18 is secured, said spring extending into the hollow projection 19 where it is secured in place by any suitable means, as for instance, by being passed to the end of the pin 20. The bore in the hollow projection 19 is comparatively large in respect to the spring and is also flared at 21 whereby the lever 8 may reciprocate under the action of the bell crank lever 15 and may freely pivot within certain limits on the pivotal pin 14. The bell crank lever 15 on leg 22 is provided with lateral extending projections 23 and 24, projection 23 fitting into a suitable slot in the manually operated pin 13, which pin is made from some form of insulation. A retractile spring 25 acts on the pin 13 to cause the same to continually bear against the projection 23. The projection 24 carries an insulating block 26 on the lower face so that when the pin 13 is pushed inwardly to its inner position, the insulating block 26 will engage the spring contact 27 and force the same downwardly against the stationary contact 28. As the contacts 27 and 28 are insulated from each other the circuit is normally opened until the parts have been moved to the position just described whereupon the telltale bulb 29 will be lighted and also the right signal lamp 30 at the rear of the automobile. This will indicate that the automobile is about to turn to the left. If desired, a hand, arrow or other designation may be shown on the lamp 30. The leg 22 of bell crank lever 15 is also provided with a depending lug 31 which acts as a rigid pawl and is adapted to snap into the notch 32 (Figs. 4 and 5) when the pin 13 and associated parts are moved inwardly. The notch 32 is formed in a spring pressed lever 33, which lever has an upstanding projection 34. This arrangement is to provide means for locking the bell crank lever in its inner position and, consequently, for locking the circuit closed. It will be noted that as the bell crank lever is moved into the inner position, lever 8 will be moved outwardly so that it will occupy a corresponding position to the position shown in Figure 4 as occupied by the lever 7.

Figure 2:
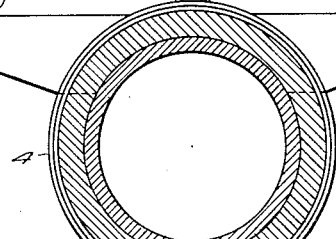
Figure 2 is a horizontal sectional view through the lower part of the hub of the steering wheel and the steering column showing an embodiment of the invention applied thereto.
Figure 3:
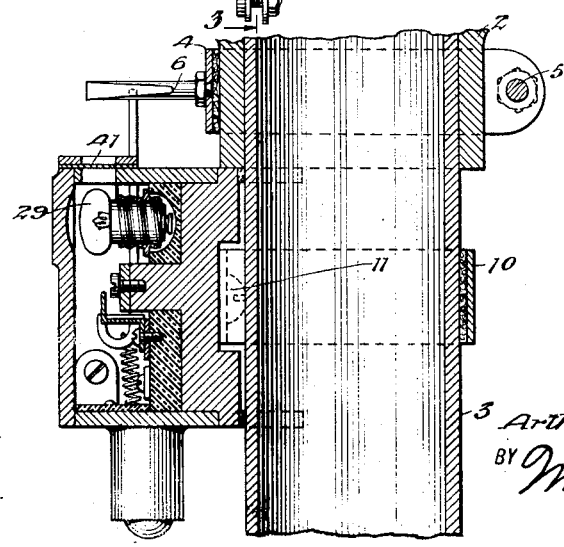
Figure 3 is a sectional view through Figure 2 approximately on line 3—3.

This construction permits the operator to cause the signal lamp at the rear to indicate what he is about to do and this indication may be provided at any desired time before the operation is performed. For instance, if a driver desires to turn to the left at the next corner he may push the button 13 while in the middle of the block and in that manner indicate to those in the rear that he is about to turn to the left. After the turning operation has been completed, the parts are automatically re-set. In this manner, the driver is only required to set his signals when he desires them to be shown and then after the signal maneuver has been accomplished the lights will be automatically turned out. This is caused by the arm 6 secured to the hub of the wheel. If the lever 8 was pushed outwardly in a similar manner to lever 7 as shown in Figure 4 when the automobile was in the middle of the block, the parts would remain in that position until the turn had been made and as the lever 6 passes the lever 8 it would merely snap by but on its return movement to a central position, as shown in Figure 2, lever 6 would push lever 8 towards the center and move said lever on its pivot 14 whereupon the end 17 would press against the upstanding lug 34 and move member 33 out of engagement with the pawl 31. This would immediately release the bell crank lever 15 and associated parts so as to allow spring 18 to move all the parts back to their former position.

Figure 6:
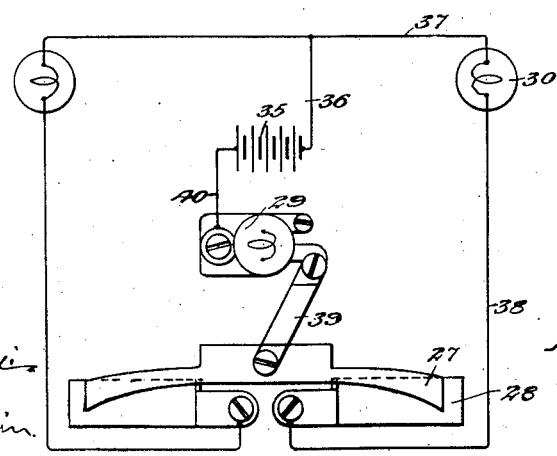
Figure 6 is a diagram showing the wiring for connecting up the switch mounted on the steering post and the signal lamps.

As shown in the diagram in Figure 6, when the button 13 is pressed the contacts 27 and 28 will be brought together whereupon the circuits of the lamps 29 and 30 will be closed. When this circuit is closed, current will flow from the battery or other suitable source 35 through wire 36, wire 37, lamp 30, wire 38, contact 28, contact 27, link 39, lamp 29, through wire 40 back to battery 35. The telltale lamp 29 may be readily seen from a suitable window 41 while the signal lamps 30 are arranged at suitable places in the rear.

What I claim is:—

1. A switch mechanism for signal devices for automobiles comprising a pair of contact plates, a movable member for causing said plates to engage, a manually actuated member for actuating said movable member, a resetting lever pivotally mounted on said movable member, a retractile spring for resiliently holding said re-setting lever in a given position, a catch for locking the movable member in its operated position, and means connected with the steering wheel of the automobile for moving said re-setting lever so as to disconnect said catch whereby said spring will cause the parts to move to a disengaged position.

2. In a switch mechanism of the character described, a pivotally mounted bell crank lever, a manually actuated button for moving said lever in one direction, a re-setting lever pivotally mounted in one end of said bell crank lever, a spring for resiliently holding said re-setting lever and said bell crank lever in a given position, a pair of contacts arranged in the path of movement of one end of said bell crank lever whereby when said manually actuated button is pressed, the contacts will be brought into engagement for closing the electric circuit, a catch for holding the parts in a given position when the contacts are brought into engagement, and means carried by the steering wheel of the automobile for moving said re-setting lever sufficiently to disconnect said catch whereby said spring will move the parts to their former position.

ARTHUR F. OCHTMAN.